United States Patent [19]

Peranio

[11] Patent Number: 4,867,875
[45] Date of Patent: Sep. 19, 1989

[54] COMBINED WATER PURIFYING BEVERAGE MAKER

[75] Inventor: Anthony Peranio, Nyack, N.Y.

[73] Assignee: Purewater Sciences International, Inc., New York, N.Y.

[21] Appl. No.: 80,673

[22] Filed: Jul. 31, 1987

[51] Int. Cl.⁴ .............................................. C02F 1/00
[52] U.S. Cl. ....................................... 210/186; 99/300; 210/240; 210/251; 210/474
[58] Field of Search .................. 99/284, 290, 295, 300, 99/306; 210/239, 240, 481, 464, 251, 474, 476, 175, 184, 186

[56] References Cited

U.S. PATENT DOCUMENTS 2,107,923  2/1938  Adams ..................................... 99/290
2,370,096  2/1945  Walder et al. ........................ 210/481
3,045,827  7/1962  Hough ................................... 210/481

Primary Examiner—Ivars Cintins
Attorney, Agent, or Firm—Louis Weinstein

[57] ABSTRACT

A water purifier continuously circulates water under treatment between heating and purification apparatus. The purified water is selectively dispensed either directly into a vessel for food preparation or other uses requiring purified water, or into a beverage maker wherein a liquid distribution apparatus is utilized to uniformly distribute the liquid, for example, into a basket containing ground coffee for producing hot coffee through a percolation technique. The combined water purifier and beverage maker reduces the utensils needed for the above-mentioned functions and reduces the amount of space required for such utensils.

5 Claims, 2 Drawing Sheets

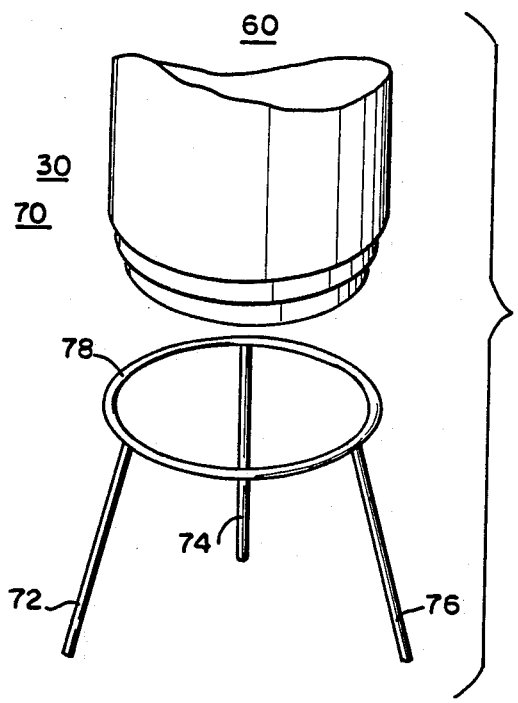
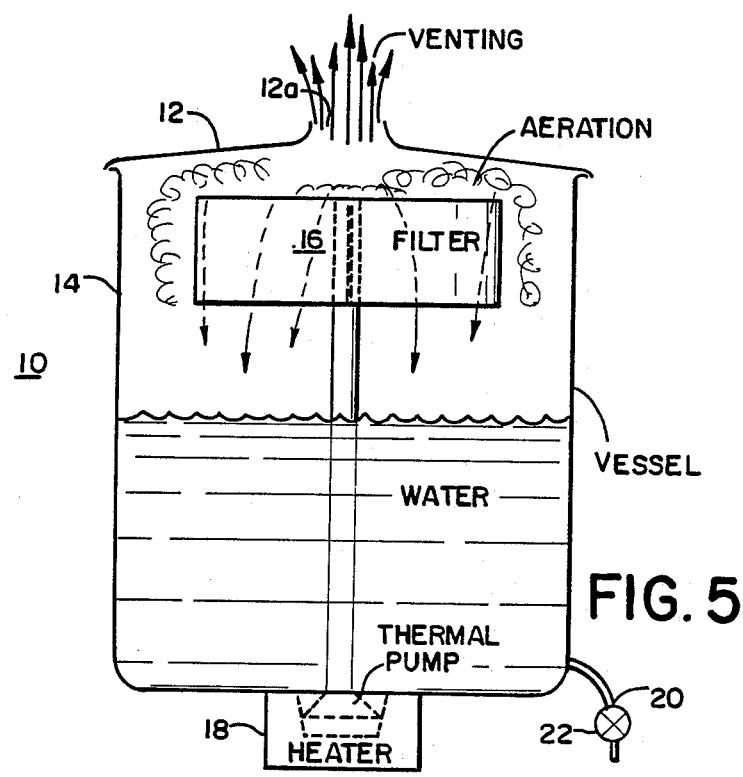

COMBINED WATER PURIFYING BEVERAGE MAKER

FIELD OF THE INVENTION

The present invention relates to percolator type units and more particularly to a novel percolator type unit adaptable for use either as a water purifier or beverage maker.

BACKGROUND OF THE INVENTION:

The growing water pollution problem has led to common dissatisfaction with the use of tap water for drinking, and preparation of beverages and foods.

The taste, smell and color of tap water is often sufficiently offensive to make ingestion of the water unpleasant, even when present in and combined with foods and beverages. In certain instances, toxic materials in water may be present in levels sufficient to be injurious to health.

One solution to the problem is the use of bottled water and purifying devices to obtain water of acceptable quality.

Some of the concerns involved in the quest for pure water are those of cost and lack of convenience. For example, a gallon of bottle of water is often more expensive then a gallon of gasoline and bottled water is inconvenient and possibly even dangerous to carry.

Certain water purification devices have the disadvantage of requiring the transfer of purified water from one vessel to another in order to place some of the water in heating units, pots or like for preparing hot beverages such as coffee.

In order to meet the need for pure water and safe and tasty beverages many homes utilize both water purifying devices and hot beverage makers such as coffee makers. These two appliances take up much needed counter-space and their functional capabilities tend to overlap to a significant degree.

BRIEF DESCRIPTION OF THE PRESENT INVENTION AND OBJECTS

It is therefore a principal object of the present invention to provide a novel means and method for purifying water and/or preparing heated beverages through the use of a single apparatus to provide purified water which may be allowed to cool to room temperature or hot purified water for a hot beverage such as coffee.

Each output is dispensed from a convenient vessel that can be heated on a stove for example, or cooled in a refrigerator, for example, or used for safe, sanitary storage of the liquid.

The apparatus of the present invention is characterized by a water purifier system which is preferably of the type described in copending application Ser. No. 054,571, filed May 26, 1987, assigned to the assignee in the present application and which is capable of purifying a predetermined quantity of water during a relatively short purification cycle on the order of 15 to 20 minutes.

Upon completion of the purification cycle the purified water, which is at or about the boiling temperature, is available for use. The purified water may be dispensed for use in food or beverage preparation directly into a vessel. This water then may either be used directly to prepare the food or beverage or may be transferred to another vessel, if desired.

In those cases where it is desired to produce a beverage through a percolation technique, a basket for holding the freshly ground coffee, for example, is supported on the rim of the aforesaid vessel. The purification system is then positioned upon the basket and a control is manipulated to dispense heated water from the purifier so that it strikes a deflector plate in the purification system to evenly distribute the heated water over the basket so as to more uniformly dispense the heated water over the basket and through its contents thereby improving the brewing action. The water percolates through the basket contents, extracting the flavors and aroma therefrom and is collected in the vessel which preferably has an insulated handle to facilitate handling and dispensing of the heated beverage.

The purifier system and basket are removed from the vessel and a removable lid is used to cover the vessel to retain the heat and protect the contents from being contaminated or adulterated by other ingredients.

It is therefore a principal object of the present invention to provide a novel combination purifying system and independent purified water container for obtaining the plural functions of holding and storing purified water, preparing foods combined with purified water, and producing beverages utilizing purified water.

Still another object of the present invention is to provide a novel combination water purifier and beverage maker comprising water purifying means and an additional vessel, basket and lid usable in conjunction with said purifying system for selectively receiving and containing purified water, producing a beverage through inclusion of the basket arranged in said container and for use in preparing the foods in combination with purified water.

Still another object of the present invention is to provide a novel combination of water purifier and beverage maker including a water purifier having valve means for directly dispensing purified water in a first position and for uniformly dispensing purified water into a basket containing ground coffee, for example, to prepare hot coffee.

Still another object of the present invention is to provide a novel combination water purifier and hot beverage maker having valve means for either directly dispensing the purified water to a separate vessel or for dispensing water upon a deflection plate for dispersing the water over a large area.

BRIEF DESCRIPTION OF THE FIGURES

The above as well as other objects of the present invention will be become apparent when reading accompanying description and drawings, in which:

FIG. 4 shows a detailed view of a stand for holding the purifier assembly of FIG. 1.

FIG. 5 shows a schematic diagram of the purifying system which is preferably incorporated into the purifier of FIG. 1.

DETAILED DESCRIPTION OF THE INVENTION

Figure 3:
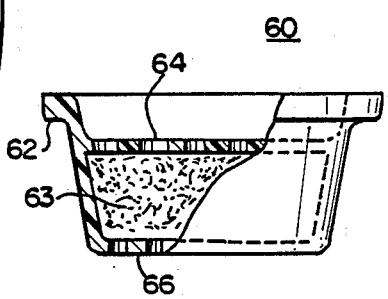
FIG. 3 shows a partially sectionalized basket which is adapted for use in the combination water purifier/beverage maker system of FIG. 1.

FIG. 3 shows a simplified schematic view of a water purification system 10 for use in the combination water purifier/beverage maker of the present invention, which water purification system is described in greater detail in applicant's copending application Ser. No. 054,571 filed May 27, 1987 and assigned to the assignee of the present invention. For purposes of understanding the present invention, only a simplified description of the water purifier will be given herein, reference to further details being incorporated herein by reference to the aforementioned copending application which is incorporated herein by reference thereto.

Purifier 10 is prepared for a purification cycle, for example, by removing lid 12 upon vessel 14 to fill filter 16 with the water being purified. The water percolates downwardly through the filter 16 which is arranged in a waterproof container and is collected in the bottom portion of vessel 14. When a predetermined amount of water has been introduced into purifier 10, the larger portion of said water being contained in the bottom of vessel 14, heater 18 is energized for purposes of heating the partially filled water introduced into the bottom of vessel 14. The heated water moves upwardly through riser tube 18, which heated water typically includes the combination of steam and water slugs and, due to the thermal pumping action is returned to filter 16 where it enters the top of the filter, works it way through the filter and, after a second filtration action, is again returned to the bottom portion of vessel 14. The water is continuously recirculated in this manner, undergoing repeated heating and filtering. After completion of a cycle, which may be of the order of 15 to 20 minutes, the water has undergone filtering and heating to an extent sufficient to remove both inorganic and organic matter to render the water safe for drinking, food preparation and the like.

Toxic constituents in the water are free to escape from the purifier through openings, such as for example, the opening 12a, provided in lid 12. Organic material such as various forms of bacteria and the like are destroyed due to the heating of the water which is brought to about the boiling temperature of water typically within 6 or 7 minutes from the initiation of the purifying cycle and is maintained at about boiling temperature throughout the remainder of the purification cycle to assure proper thermal pumping action as well as assuring destruction of such organic matter. Other important advantages of the water purifier are set forth in detail in the aforementioned copending application Ser. No. 054,571.

Upon completion of the cycle the heater 18 is preferably automatically turned off by a timer (not shown for purposes of simplicity) and the water, if desired to be used hot, may be extracted from vessel 14 through outlet conduit 20 by opening valve 22.

Figure 1:
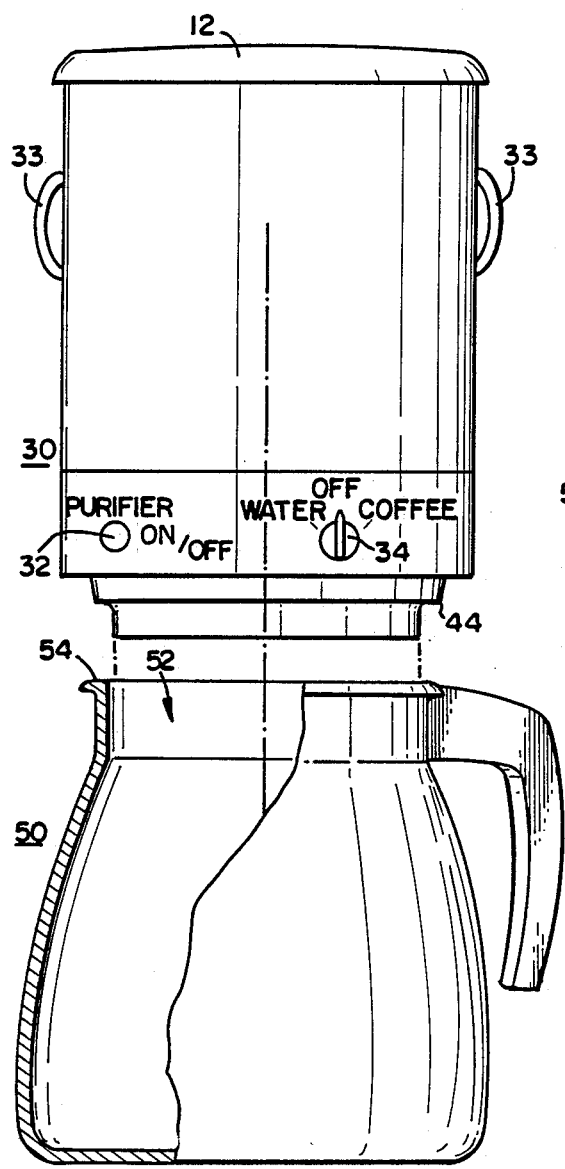
FIG. 1 shows a partially sectional exploded elevation view of a water purifier/beverage maker system embodying the principles of the present invention and showing the purifier and a cooperating vessel in exploded fashion.
Figure 2:
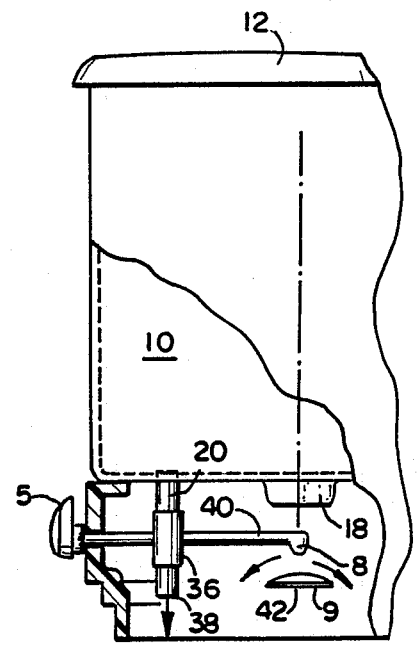
FIG. 2 shows a purifier of the type shown in FIG. 1 in which a portion thereof has been sectionalized to better understand its contents.

The purifier assembly 30 of FIG. 1 is comprised of purifier 10 plus on/off button 32 and control knob 34 connected to operate three-position valve 36.

Three position valve 36 replaces the simple on-off valve 22 shown in FIG. 5.

When used simply as a water purifier, the reduced diameter portion 44 of water purifier 30 is placed upon the open end 52 of container 50 having handle 54. During a purification cycle, the valve control knob 34 is maintained in the "off" position and button 32 is activated to energize heater 18 (FIG. 1). The purification cycle is preferably automatically controlled by a built-in timer as described, for example, in detail in the aforementioned application Ser. No. 054,571, filed May 26, 1987, the controls being preferably housed within the lower portion of purifier 30 beneath purification assembly 10. Upon the completion of a purification cycle, unit 10 is automatically turned off. If desired, a lamp or audible signal or both are energized. In the event it is desired to simply draw heated water for food preparation or other purposes, control knob 34 is rotated to the "water" position, causing valve 36 to couple conduit 20 to outlet conduit 38 to directly introduce heated, purified water into container 50.

If it is desired to have the water cool first, the water can either be cooled within purifier assembly 30 or alternatively the water may be partially or completely drawn from unit 30 and delivered to container 50 where it may be cooled for drinking, food preparation or other purposes.

In the event it is desired to prepare a hot beverage such as coffee, a basket 60 shown in FIG. 3 is filled with ground coffee 63 and is placed upon the opening of container 52 so that its lip 62 rests upon the lip 54 of container 50. The purifier assembly 30 is placed upon basket 60 so that its reduced diameter lower end 44 rests upon lip 62 of basket 60. The control knob 34 is moved to the "COFFEE" position causing valve 36 to link outlet conduit 20 with conduit 40 which delivers the heated, filtered water through the outlet provided at the free end of conduit 40 so that water falls upon the convex surface of deflector 42 which spreads the heated water over the inlet surface 64 of beverage basket 60. The uniform distribution of the heated, purified water provides a more uniform percolation of the heated, purified water through the ground coffee 63 assuring that the aroma and other desired flavors contained within it are efficiently extracted from it before the beverage flows out of the openings 66 in the bottom of beverage basket 60.

The lower end of beverage basket 60 is provided with outlet openings 66 along the lower surface which are sufficient to permit the egress of the heated filtered water which has extracted the aromas and other flavors from the ground coffee while at the same time retaining the coffee grounds in basket 60 and preventing the grounds from entering container 50. If desired a filter bag may be placed inside basket 60 to further enhance retention of the coffee grounds in the basket. The beverage may either be served hot or allowed to cool and served as a refreshing cold drink. Obviously tea may be brewed in a similar fashion.

The purification unit 30 may be provided with a pair of insulated handles 33 to permit the unit 30 to be lifted without danger to the user in order to be placed upon one or more additional containers or vessels for extracting the purified contents thereof.

As another alternative, the purifier assembly 30 may be positioned upon a stand 70 shown in FIG. 4 and having a minimum of three legs 72, 74 and 76 joined to a ring-shaped support 78 to form a sturdy supporting tripod for the purification assembly 30 whereby the height of the tripod ring-shaped portion 78 is sufficient to permit a container 50 to be placed beneath the ring-shaped portion 78 and allowing the container 50 to be inserted and/or removed without the need for lifting purifier assembly 30, which arrangement provides a distinct advantage to the user, especially when it is desired to deliver heated purified water to two or more containers or other vessels immediately after the purification cycle, thus avoiding the need to lift the purifier assembly when it contains purified water maintained at close to the boiling point.

Although the support assembly 70 as shown a tripod support, the support may take any other shape and in fact may be partially closed to retain heat within the region in which the container 50 may be positioned. For example, the support tripod may be modified to comprise a support having a substantially cylindrical shaped bottom portion having an opening which is large enough to receive container 50 and otherwise closed in order to retain the heat of the liquid being introduced into container 50 from purifier assembly 30.

As another alternative, the purifier unit may be firmly secured to the support, although it is desirable to provide the purifier unit 10 within assembly 30 with a design which facilitates removal of the components in order to facilitate observation, service and maintenance upon the components thereof and especially the filter which can be expected to require periodic replacement typically every several months or so.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention here.

What is claimed is:

1. A combined water purification/beverage making apparatus comprising:
   purifier means for purifying water including a vessel, filter means in said vessel for filtering said water, heating means for heating said water and means for repeatedly recirculating the water being purified between said heating means and said filter means in a repetitive manner and for a predetermined interval of time sufficient to cause the water in said vessel to reach a predetermined purification level;
   a container usable for producing a beverage;
   means for producing a beverage, said beverage producing means being positonable in said container;
   said purifier means being removably positioned upon said container or said beverage producing means;
   valve means for dispensing purified water within said purifier means when moved to a predetermined position for dispensing purified water into said container when removably positioned thereon.

2. The apparatus of claim 1 further comprising basket means positioned in said container a spaced distance above the bottom of the container and receiving ground material through which said liquid percolates for collection in said container in the region of said container beneath said basket means;
   said basket means including means for retaining said ground material while permitting said water to flow through said basket means and into said container to extract the flavors and aromas from said ground material while preventing said ground material from being introduced into said container.

3. The apparatus of claim 1 further comprising heat insulating handles provided on said purifier means to permit lifting and transportation of said purifier means without being subjected to the elevated heat of the contents thereof.

4. A combined purification/beverage making apparatus comprising:
   purifier means for purifying water including filter means and heating means and means for recirculating the water being purified between said heating means and said filter means in a repetitive manner and for a predetermined interval of time sufficient to cause the water to reach a predetermined purification level;
   a container;
   said purifier means being removably positioned upon said container;
   valve means for dispensing purified water within said purifier means when moved to a predetermined position;
   basket means positioned in said container and receiving ground material through which said liquid percolates;
   said basket means including means for retaining said ground material while permitting said water to flow through said basket means and into said container to extract the flavors and aromas from said ground material while preventing said ground material from being introduced into said container;
   said purifier means further including a deflection plate positioned substantially directly above said basket means;
   said valve means including a three-ported valve means having a first position for directing fluid directly into said container and offset to a conduit for delivery of said fluid immediately above said deflector means which causes the fluid passing over the surface of said deflector means to be spread out substantially uniformly over said basket means in order to uniformly pass through the ground material contents of said basket means, and a third off or no flow position.

5. The apparatus of claim 4 further comprising support means for supporting said purifier means;
   said support means being provided with an open region at one portion thereof sufficient to receive a container having an open top insertable through said open region and beneath said support means;
   the height of said support means being sufficient to place the container therebetween in order to directly receive fluid from said purifier means when said valve means is in one of its first and second positions.

* * * * *

UNITED STATES PATENT AND TRADEMARK OFFICE
CERTIFICATE OF CORRECTION

PATENT NO. : 4,867,875

DATED : September 19, 1989

INVENTOR(S) : Anthony Peranio

It is certified that error appears in the above-identified patent and that said Letters Patent is hereby corrected as shown below:

At Column 3, line 68, $\neq$off" should be -- "off"--

At Column 6, line 39, after "offset" insert the following -- from said deflection means, a second position for directing fluid --

Signed and Sealed this

Twenty-sixth Day of February, 1991

Attest:

HARRY F. MANBECK, JR.

*Attesting Officer*      *Commissioner of Patents and Trademarks*